(12) United States Patent
Lee et al.

(10) Patent No.: US 7,936,805 B2
(45) Date of Patent: May 3, 2011

(54) TRANSMITTER AND FREQUENCY HOPPING METHOD OF THE SAME

(75) Inventors: Hee Soo Lee, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 816 days.

(21) Appl. No.: 11/721,274

(22) PCT Filed: Dec. 7, 2005

(86) PCT No.: PCT/KR2005/004186
§ 371 (c)(1),
(2), (4) Date: Jun. 8, 2007

(87) PCT Pub. No.: WO2006/062355
PCT Pub. Date: Jun. 15, 2006

(65) Prior Publication Data
US 2009/0238242 A1     Sep. 24, 2009

(30) Foreign Application Priority Data

Dec. 8, 2004  (KR) .................. 10-2004-0103243
Jun. 20, 2005 (KR) .................. 10-2005-0052960

(51) Int. Cl.
*H04B 1/707* (2006.01)
(52) U.S. Cl. ...................................... 375/135
(58) Field of Classification Search ........... 375/132–137
See application file for complete search history.

(56) References Cited

U.S. PATENT DOCUMENTS

| 6,275,518 | B1 | 8/2001 | Takahashi et al. |
| 6,501,785 | B1 | 12/2002 | Chang et al. |
| 6,711,120 | B1 * | 3/2004 | Laroia et al. ............. 370/204 |
| 7,502,310 | B2 * | 3/2009 | Hwang et al. ............ 370/208 |

FOREIGN PATENT DOCUMENTS

| JP | 08-331127 | 12/2006 |
| KR | 10-2000-0062825 A | 10/2000 |
| KR | 10-2001-0003434 A | 1/2001 |
| KR | 10-2001-0098569 A | 11/2001 |
| KR | 10-2004-0057875 A | 7/2004 |

OTHER PUBLICATIONS

Chen, et al., "Multicarrier CDMA with adaptive frequency hopping for mobile radio systems," IEEE J., Selected Areas in Communication, 14(9):1852-1858 (Dec. 1996).

* cited by examiner

*Primary Examiner* — Kevin Y Kim

(57) ABSTRACT

Provided are a transmitter and a frequency hopping method thereof. The transmitter includes: a channel encoder outputting a bit stream of encoded information data; a symbol mapper outputting a symbol stream obtained by constellating the bit stream; a frequency allocation and hopping part determining a frequency to be allocated to the symbol stream; and a multi-carrier modulator loading and outputting the symbol stream output by the frequency allocation and hopping part on a multi-carrier, wherein the frequency allocation and hopping part comprises a logical frequency mapping part determining a frequency capable of optimally averaging adjacent cell interference, and a physical frequency mapping part mapping the determined frequency one-to-one and determining a frequency.

8 Claims, 6 Drawing Sheets

[Figure 1]
(a)
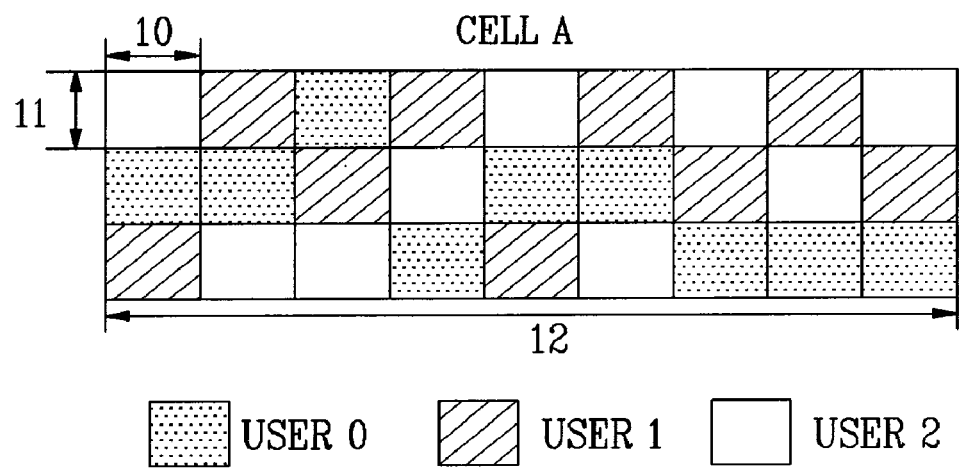
(b)
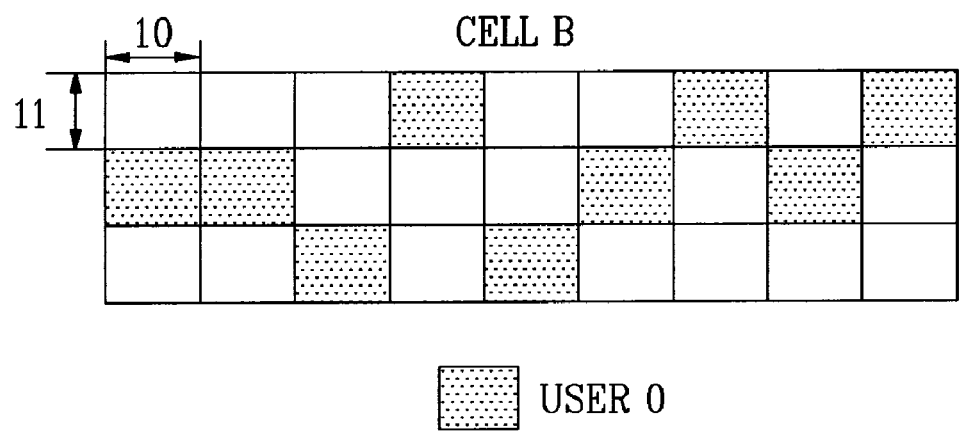

[Figure 2]
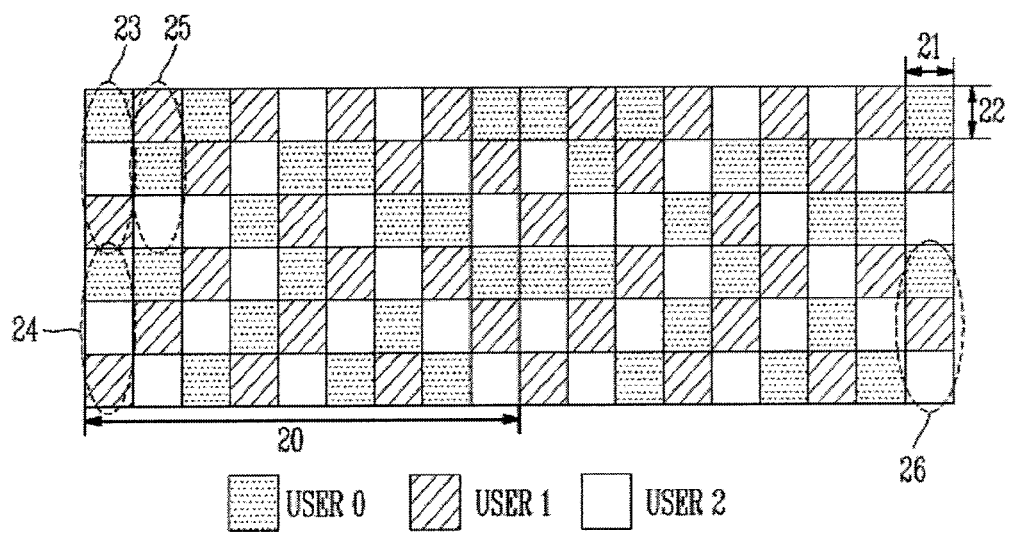

| cell A | | | | | |
|---|---|---|---|---|---|
| user 0 | 0 | 1 | 2 | 3 | 4 |
| user 1 | 1 | 2 | 3 | 4 | 0 |
| user 2 | 2 | 3 | 4 | 0 | 1 |
| user 3 | 3 | 4 | 0 | 1 | 2 |
| user 4 | 4 | 0 | 1 | 2 | 3 |

| cell B | | | | | |
|---|---|---|---|---|---|
| user 0 | 0 | 2 | 4 | 1 | 3 |
| user 1 | 1 | 3 | 0 | 2 | 4 |
| user 2 | 2 | 4 | 1 | 3 | 0 |
| user 3 | 3 | 0 | 2 | 4 | 1 |
| user 4 | 4 | 1 | 3 | 0 | 2 |

(b)

| $f^k(L)$ | | | | | |
|---|---|---|---|---|---|
|  | k=0 | k=1 | k=2 | k=3 | k=4 |
| L=0 | 0 | 2 | 4 | 0 | 3 |
| L=1 | 1 | 4 | 2 | 1 | 1 |
| L=2 | 3 | 0 | 0 | 4 | 2 |
| L=3 | 2 | 1 | 1 | 3 | 0 |
| L=4 | 4 | 3 | 3 | 2 | 4 |

(c)

| cell A | | | | | |
|---|---|---|---|---|---|
| user 0 | 0 | 4 | 0 | 3 | 4 |
| user 1 | 1 | 0 | 1 | 2 | 3 |
| user 2 | 3 | 1 | 3 | 0 | 1 |
| user 3 | 2 | 3 | 4 | 1 | 2 |
| user 4 | 4 | 2 | 2 | 4 | 0 |

| cell B | | | | | |
|---|---|---|---|---|---|
| user 0 | 0 | 0 | 3 | 1 | 0 |
| user 1 | 1 | 1 | 4 | 4 | 4 |
| user 2 | 3 | 3 | 2 | 3 | 3 |
| user 3 | 2 | 2 | 0 | 2 | 1 |
| user 4 | 4 | 4 | 1 | 0 | 2 |

| cell A | | | | | |
|---|---|---|---|---|---|
| user 0 | 0 | 1 | 2 | 3 | 4 |
| user 1 | 1 | 2 | 3 | 4 | 0 |
| user 2 | 2 | 3 | 4 | 0 | 1 |
| user 3 | 3 | 4 | 0 | 1 | 2 |
| user 4 | 4 | 0 | 1 | 2 | 3 |

| cell B | | | | | |
|---|---|---|---|---|---|
| user 0 | 0 | 2 | 4 | 1 | 3 |
| user 1 | 1 | 3 | 0 | 2 | 4 |
| user 2 | 2 | 4 | 1 | 3 | 0 |
| user 3 | 3 | 0 | 2 | 4 | 1 |
| user 4 | 4 | 1 | 3 | 0 | 2 |

(b)

| $f^k(L)$ | | | | | |
|---|---|---|---|---|---|
|  | k=0 | k=1 | k=2 | k=3 | k=4 |
| L=0 | 0 | 0 | 0 | 0 | 0 |
| L=1 | 1 | 2 | 3 | 4 | 1 |
| L=2 | 2 | 4 | 1 | 3 | 2 |
| L=3 | 3 | 1 | 4 | 2 | 3 |
| L=4 | 4 | 3 | 2 | 1 | 4 |

(c)

| cell 0 | | | | | |
|---|---|---|---|---|---|
| user 0 | 0 | 2 | 1 | 2 | 4 |
| user 1 | 1 | 4 | 4 | 1 | 0 |
| user 2 | 2 | 1 | 2 | 0 | 1 |
| user 3 | 3 | 3 | 0 | 4 | 2 |
| user 4 | 4 | 0 | 3 | 3 | 3 |

| cell 1 | | | | | |
|---|---|---|---|---|---|
| user 0 | 0 | 4 | 2 | 4 | 3 |
| user 1 | 1 | 1 | 0 | 3 | 4 |
| user 2 | 2 | 3 | 3 | 2 | 0 |
| user 3 | 3 | 0 | 1 | 1 | 1 |
| user 4 | 4 | 2 | 4 | 0 | 2 |

[Figure 5]
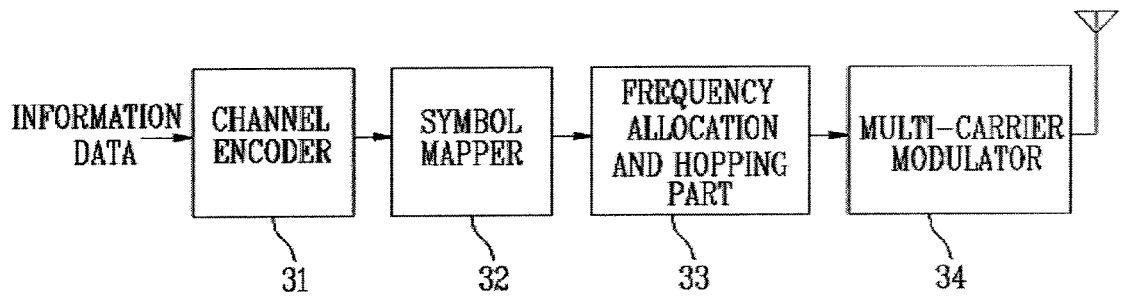
[Figure 6]
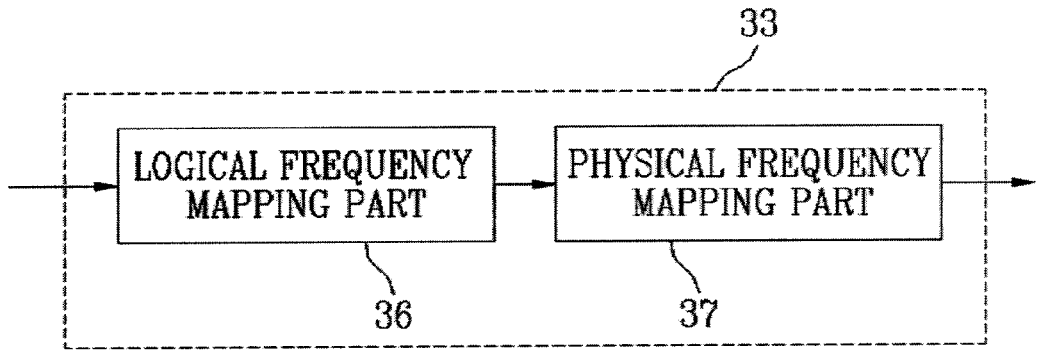
[Figure 7]
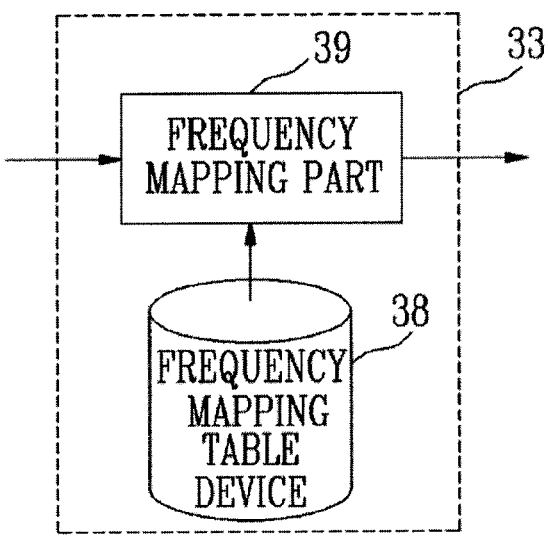

[Figure 8]
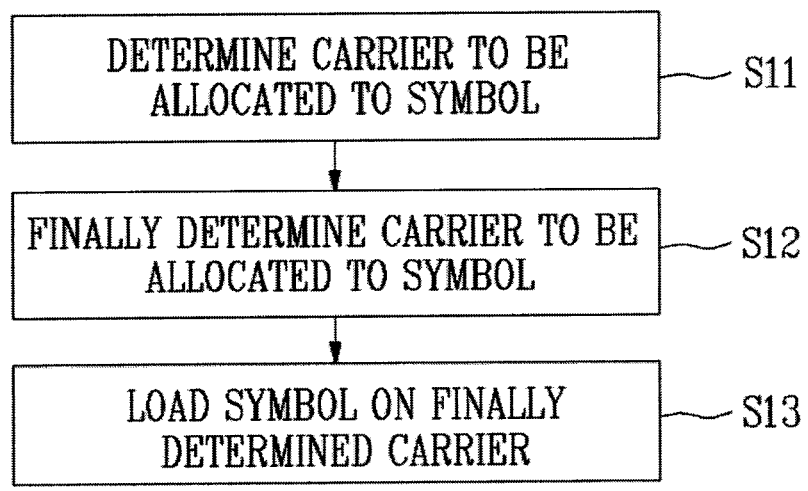
[Figure 9]
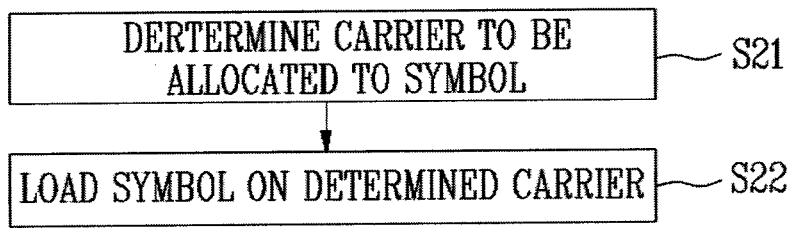

TRANSMITTER AND FREQUENCY HOPPING METHOD OF THE SAME

TECHNICAL FIELD

The present invention relates to a transmitter and a frequency hopping method thereof, and more particularly, to a transmitter and a frequency hopping method thereof in which interference between adjacent cells in a multi-carrier cellular system and interference between adjacent carriers within the same cell can both be averaged simultaneously.

BACKGROUND ART

In a multi-carrier cellular system, one or more carriers are allocated to each user for data transmission. Orthogonal Frequency Division Multiplexing (Hereinafter, referred to as "OFDM") is a well-known multi-carrier communication method that is widely used in cellular systems.

The OFDM method is an example of a multi-carrier transmission technique for dividing all transmissible bands into several narrow band sub-carriers, and modulating and transmitting the sub-carriers in parallel. In the OFDM method, a small amount of low-speed data is allocated to each sub-carrier.

Owing to the use of mutually orthogonal sub-carriers, the OFDM method can enhance efficiency of frequency use and overcome a multi-carrier channel using a simple frequency region equalizer having one tap. In recent years, owing to implementation of high speed using Fast Fourier Transform (FFT), the OFDM method is widely used as a transmission method of a high-speed digital communication system. Specifically, in the field of mobile/wireless communications, the OFDM method is used in a Wireless Local Area Network (WLAN), a Wireless Metropolitan Area Network (WMAN), and a cellular mobile communication system.

The multi-carrier cellular system can be configured to allocate a part (one or more) of the sub-carriers to each user and thus provide service to a plurality of users. Here, the carriers allocated to each user can be equally distributed across all bands, or time-dependent frequency hopping can be performed. This is used together with channel coding and interleaving, to obtain an effect of frequency diversity and an effect of averaging interference from adjacent cells in a cellular environment. In the OFDM environment, this is described in detail in J. Chuang and N. Sollenberger, "Beyond 3G: Wideband Wireless Data Access Based on OFDM and Dynamic Packet Assignment", IEEE Communication Magazine, Volume 38, Issue 7, PP. 78-87, July 2000.

FIGS. 1A and 1B illustrate a conventional frequency hopping method based on a random sequence, wherein FIG. 1A illustrates carrier allocation in a cell "A" and FIG. 1B illustrates carrier allocation in a cell "B".

In FIGS. 1A and 1B, the vertical direction of a lattice corresponds to frequency and reference numeral 11 denotes one sub-carrier. Further, the horizontal direction of the lattice represents time and reference numeral 10 denotes a symbol period. Reference numeral 12 denotes a unit of channel coding. That is, one channel is comprised of nine symbols. Further, the carrier allocated to each user is allocated on the basis of the random sequence.

FIG. 1A shows an example of a three-channel construction format within the cell "A". FIG. 1B shows an example of a one-channel construction format within the cell "B". It is assumed that the cell "A" and the cell "B" are adjacent or in very close proximity to each other. A channel construction format (frequency allocation or hopping pattern) should be different between the adjacent or closely positioned cells in order to average interference from the adjacent cells. If the two closely positioned cells use the same hopping pattern, lasting and heavy interference is caused between the same channels. In the examples of FIGS. 1A and 1B, for a user 0 of the cell "A" and a user 0 of the cell "B", the interference is caused only in 3 out of the 9 symbol periods which constitute one channel coding period. In other words, the interference is not concentrated only in one specific channel, but rather an interference averaging effect occurs such that there is relatively equal interference in other channels as well. Consequently, the cells within a mobile communication network based on a frequency hopping OFDM each have an inherent hopping pattern, and closely positioned cells have different hopping patterns from one another, thereby averaging the influence of interference from adjacent cells. For the frequency hopping pattern (channel construction format), a conventional method uses a pattern formed using a pseudo random sequence.

Assuming that the randomly generated frequency hopping pattern is formed as in FIGS. 1A and 1B, a level of interference affecting the user 0 of the cell "B" and each user of the cell "A" will be described. As shown in the drawings, the user 0 of the cell "A" experiences interference only for 3 symbols. Whereas, the user 1 of the cell "A" experiences interference only during 2 symbols, and thus experiences less interference. However, the user 2 experiences interference during 4 symbols, and therefore is subjected to heavy interference. The above frequency collision frequently occurring between specific channels causes heavy interference, thereby causing a high Bit Error Rate (BER) and deteriorating the performance of a system. In a case where the total number of symbols is 3*9=27 and the number of channels (the number of simultaneous users) is 3, as in the examples of FIGS. 1A and 1B, the best hopping pattern in terms of interference averaging is where the interference occurs only during the 3 symbols between all channels. Thus, the frequency allocation or hopping pattern formed by the pseudo random sequence has a drawback in that due to irregularity of a level of interference between the channels of two adjacent cells, complete interference averaging cannot be performed.

Further, in addition to the aforementioned adjacent cell interference averaging, the carrier allocation and hopping pattern of the multi-carrier cellular system should also average interference coming from other users within the same cell. In general, in the multi-carrier system, the carriers are orthogonal resources which do not interfere with one another. Therefore, if carriers different from one another are allocated and data is transmitted to the users, no interference occurs. However, even when different users transmit data in an upward link using different carriers, when adjacent carriers are used and the users movement speeds are different, the Doppler effect can render the adjacent carriers similar enough to interfere with one another. Therefore, it is necessary to average allocation of adjacent carriers between users.

Referring again to the example of FIG. 1, there are two cases in which the user 1 of the cell "A" uses the underlying sub-carrier of the user 0, but there are four cases in which the user 0 uses the underlying sub-carrier of the user 2. If adjacent carriers are used between specific channels many times, adjacent channel interference is heavy, resulting in a high BER and deteriorating the performance of the system. Therefore, it is necessary to average the number of times adjacent channels are allocated.

DISCLOSURE

Technical Problem

The present invention is directed to implementation of a transmitter and a frequency hopping method thereof in a multi-carrier cellular system, according to which interference between adjacent cells and interference between adjacent carriers within the same cell can be simultaneously averaged.

Technical Solution

The first aspect of the present invention provides a transmitter including: a channel encoder outputting a bit stream of encoded information data; a symbol mapper outputting a symbol stream obtained by constellating the bit stream; a frequency allocation and hopping part determining a frequency to be allocated to the symbol stream; and a multi-carrier modulator loading and outputting the symbol stream output by the frequency allocation and hopping part on a multi-carrier, wherein the frequency allocation and hopping part comprises a logical frequency mapping part determining a frequency capable of optimally averaging adjacent cell interference, and a physical frequency mapping part mapping the determined frequency from the logical frequency mapping part one-to-one and determining a frequency.

The second aspect of the present invention provides a transmitter including: a channel encoder outputting a bit stream of encoded information data; a symbol mapper outputting a symbol stream obtained by constellating the bit stream; a frequency allocation and hopping part determining a frequency to be allocated to the symbol stream; and a multi-carrier modulator loading and outputting the symbol stream output from the frequency allocation and hopping part on a multi-carrier, wherein the frequency allocation and hopping part comprises a frequency mapping table device outputting a table value for optimally averaging both adjacent cell interference and adjacent carrier interference within the same cell simultaneously, and a frequency mapping part determining a frequency to be allocated to the symbol stream output from the symbol mapper according to the table value output from the frequency mapping table device.

The third aspect of the present invention provides a frequency hopping method of a transmitter, the method including the steps of: (a) determining a carrier to be allocated to a symbol such that adjacent cell interference is optimally averaged; (b) mapping the determined carrier using a one-to-one mapping function and finally determining a carrier to be allocated to the symbol; and (c) loading the symbol on the carrier determined in step (b).

The fourth aspect of the present invention provides a frequency hopping method of a transmitter, the method including the steps of: (a) determining a carrier to be allocated to a symbol such that adjacent cell interference and adjacent carrier interference within the same cell are both optimally averaged; and (b) loading the symbol on the determined carrier.

ADVANTAGEOUS EFFECTS

As described above, the transmitter and the frequency hopping method thereof provide the advantage of enabling adjacent cell interference and adjacent carrier interference within the same cell in a multi-carrier cellular system to be simultaneously averaged.

DESCRIPTION OF DRAWINGS

FIGS. 1A and 1B illustrate a conventional frequency hopping method based on a random sequence, wherein FIG. 1A illustrates carrier allocation in a cell "A" and FIG. 1B illustrates carrier allocation in a cell "B";

FIG. 2 illustrates a basic concept employed in a transmitter and a frequency hopping method thereof according to an exemplary embodiment of the present invention, by taking an example where three channels (three concurrent users) are multiplexed;

FIG. 3A illustrates an example where a logic resource is allocated in a method based on a mutual orthogonal Latin square or a method proposed in "Frequency Hopping Method in OFDM systems";

FIG. 3B illustrates an example of a predetermined mapping function;

FIG. 3C illustrates an actual carrier allocation pattern subjected to a mapping function of FIG. 3B;

FIG. 4 illustrates a result obtained when a carrier is allocated by Equations 1 and 2;

FIG. 5 illustrates a transmitter according to an exemplary embodiment of the present invention;

FIG. 6 illustrates an example of a frequency allocation and hopping part employed in FIG. 5;

FIG. 7 illustrates another example of a frequency allocation and hopping part employed in FIG. 5;

FIG. 8 illustrates a frequency hopping method of a transmitter according to an exemplary embodiment of the present invention; and FIG. 9 illustrates a frequency hopping method of a transmitter according to another exemplary embodiment of the present invention.

MODE FOR INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

FIG. 2 illustrates a basic concept employed in a transmitter and a frequency hopping method thereof according to an exemplary embodiment of the present invention, by taking an example where three channels (three concurrent users) are multiplexed. In general, the present invention includes cases in which a plurality of carriers or just one carrier is allocated during one symbol period, and it is assumed that frequency allocation and hopping are performed during a plurality of symbol periods. In FIG. 2, reference numeral 21 denotes one symbol period, and reference numeral 22 denotes one carrier.

FIG. 2 illustrates a case in which two carriers are allocated to one user every symbol period. Reference numeral 20 of FIG. 2 denotes a period with which frequency allocation and hopping is repeated, according to an example where the period is comprised of nine symbol periods.

In the present invention, a batch of adjacent carriers equal in number to channels (the number of concurrent users) is called one carrier group, and it is assumed that one carrier of each carrier group is allocated to each user.

In FIG. 2, reference numeral 23 denotes a batch of carriers 0, 1, and 2 in a symbol period 0 and is called a carrier group 0, reference numeral 24 denotes a batch of carriers 3, 4, and 5 in the symbol period 0 and is called a carrier group 1, and reference numeral 25 denotes a batch of carriers 0, 1, and 2 of the symbol period 1 is called a carrier group 2. In the example of FIG. 2, there are a total of eighteen carrier groups 0-17 during one frequency allocation and hopping pattern period.

Reference numeral 26 of FIG. 2 denotes carrier group 17 in a second frequency hopping pattern period. In the present invention, it is assumed that one carrier is allocated to each channel (user) in one carrier group. It is assumed that, during one frequency allocation period, there are k carrier groups, and one carrier group is comprised of J carriers. It is assumed that $f_j^k$ denotes a carrier allocated to a $j^{th}$ channel (user) in a $k^{th}$ carrier group. Here, $f_j^k$ is a natural number between 0 and J−1. Defining the frequency allocation and hopping pattern of the $j^{th}$ channel means defining a sequence of $f_j^0, f_j^0, \ldots, f_j^{k-1}$.

In the present invention, two steps of resource allocation are performed to define the carrier allocation and hopping pattern $f_j^k$. The first step is a process of allocating a logic resource, and the second step is a process of actually mapping the logic resource to a physical carrier.

In the first step of logic resource allocation, different logic resources are allocated to each channel user with there being J logical carriers (resources) in each carrier group. It is assumed that $L_j^k$ is a logic resource allocated to the $j^{th}$ channel (user) in the $k^{th}$ carrier group. In allocating the logic resource, adjacent cell interference is averaged as much as possible. Resource allocation methods for completely averaging adjacent cell interference include a method based on a mutual orthogonal Latin square and a method proposed in pending Korean Patent Publication No. 1020040057875 entitled "Frequency Hopping Method in OFDM Systems". The method based on the mutual orthogonal Latin square is described in detail in U.S. Pat. No. 6,473,418 B1 entitled "Orthogonal Frequency Division Multiplexing Based Spread Spectrum Multiple Access" and a report entitled "Channel Coding Strategies for Cellular Radio" by Gregory J. Pottie and A. Robert Calderbank, IEEE Transactions on Vehicular Technology. Either one of these two methods or another method can used for the logic resource allocation of the present invention. However, if the number of channels is two or more different prime numbers, as divisors, the mutual orthogonal Latin square cannot be employed. Accordingly, the method proposed in "Frequency Hopping Method in OFDM Systems" is preferable.

FIG. 3A illustrates an example where the logic resource is allocated in the method based on the mutual orthogonal Latin square or the method proposed in "Frequency Hopping Method in OFDM Systems" when J=5, and k=5 (when "J" is a prime number, both methods yield the same result). In the example of FIG. 3A, it is shown that a user 0 of a cell "A" uses a logic resource 0 in the carrier group 0 and is allocated a logic resource 1 in the carrier group 1.

Whereas, a user 2 of a cell "B" uses a logic resource 2 in the carrier group 0 and a logic resource 4 in the carrier group 1.

As shown in FIG. 3A, the number of logic resource collisions occurring between a predetermined user of the cell "A" and a predetermined user of the cell "B" is exactly one. In other words, complete interference averaging is performed at a logic resource level.

If logic resource allocation is directly used with physical carrier allocation, interference averaging can be completely performed but exhibits performance for adjacent channel interference. In one example, this is because the user 1 uses the adjacent carrier of the user 0 in a carrier group 4.

In the present invention, interference averaging is performed at the logic resource level and a process of mapping the logic resource to the physical carrier is added. The mapping of the logic resource to the physical carrier is performed by defining a suitable mapping function M(L). In other words, the logic resource L is mapped to the physical resource M(L). However, the mapping function is not the same for all carrier groups but rather is different for each carrier group. If the mapping function in a carrier group k is denoted by $M^k(L)$, the following relation holds:

$$f_j^k = M^k(L_j^k)$$

Performance with regard to adjacent carrier interference depends on the mapping function. The mapping function can also be a predetermined randomizing function. However, it is essential that the mapping function is a one-to-one mapping function so there is no duplicate allocation of the same carrier. If this condition is satisfied, interference averaging performance at the logic resource level can be upheld.

FIG. 3B illustrates an example of a predetermined mapping function. An actual carrier allocation pattern subjected to the mapping function of FIG. 3B is shown in FIG. 3C. It can be appreciated from FIG. 3C that a property of complete interference averaging is maintained and adjacent carrier performance is considerably improved.

If k=J, a carrier allocation and hopping pattern exhibiting better performance can be made. It is assumed that $L_{ij}^k$ is the logic resource of the carrier group k of the user j of the cell i.

$$L_{ij}^k = (k \times i + j) \bmod J \quad \text{Equation 1}$$

A resource allocation method of Equation 1 is a result of the methods proposed in the mutual orthogonal Latin square and the "Frequency Hopping Method in OFDM Systems". In the present invention, the logic resource is allocated by Equation 1, and then physical carrier mapping is performed by the following Equation:

$$f_{ij}^k = M^k(L_{ij}^k) = \begin{cases} (k+1) \times L_{ij}^k (\bmod J) & \text{if } k < J-1 \\ r \times L_{ij}^k (\bmod J) & \text{if } k = J-1, \end{cases} \quad \text{[Equation 2]}$$

r is predetermined natural number

FIG. 4 illustrates a result obtained when the carrier is allocated using Equations 1 and 2, wherein FIG. 4A illustrates logic resource allocation based on Equation 1, FIG. 4B illustrates the physical carrier mapping function based on Equation 2, and FIG. 4C illustrates the resultant physical carrier allocation and hopping pattern. It can be appreciated from FIG. 4 that complete interference averaging is performed and adjacent channel interference performance is excellent. In fact, this allocation pattern exhibits the best adjacent carrier interference performance among patterns yielding complete interference averaging.

When k=N*J*(J−1), the following carrier allocation and hopping is performed and optimal performance can be obtained (N denotes a predetermined natural number).

First, logic resource allocation is performed using the following Equation 3.

$$L_{ij}^k = (k \times i + j) \bmod J \quad \text{Equation 3}$$

$$f_{ij}^k = M^k(L_{ij}^k) = \begin{cases} (k+1) \times L_{ij}^k (\bmod J) & \text{if } k(\bmod j) < J-1 \\ (r+1) \times L_{ij}^k (\bmod J) & \text{if } k(\bmod j) = J-1, r = k \% J \end{cases} \quad \text{[Equation 4]}$$

where,
k % J is a quotient obtained by dividing k by J.
FIG. 5 illustrates a transmitter according to an exemplary embodiment of the present invention.

Referring to FIG. 5, the transmitter includes a channel encoder 31, a symbol mapper 32, a frequency allocation and hopping part 33, and a multi-carrier modulator 34.

The channel encoder 31 receives information data and encodes it in order to detect or correct errors which may occur during transmission. The channel encoder 31 can perform convolutional encoding, turbo encoding, or low density parity check encoding, for example. It does not matter which type of encoding the channel encoder 31 performs.

The symbol mapper 32 receives the information data in a bit stream format from the channel encoder 31, and outputs a symbol stream obtained by constellating the received information data. By this constellation, the information data in bit stream format is mapped to X and Y coordinate values.

The frequency allocation and hopping part 33 determines which carriers the symbol streams output from the symbol mapper 32 are allocated to, what frequencies are allocated to the symbol stream in the above-described method of sequentially performing logical carrier allocation and physical carrier mapping, and what frequencies are allocated to the symbol stream in the method of simultaneously performing logical frequency allocation and physical frequency mapping. The frequency mapping and hopping part 33 will be described in detail later with reference to FIGS. 6 and 7.

The multi-carrier modulator 34 loads a symbol stream which is to be allocated to a frequency determined in the frequency allocation and hopping part 33, substantially onto a multi-carrier, and transmits the loaded symbol stream to an antenna. The multi-carrier modulator 34 can include an Inverse Fast Fourier Transformer (IFFT), for example.

FIG. 6 illustrates an example of the frequency allocation and hopping part employed in FIG. 5.

Referring to FIG. 6, the frequency allocation and hopping part 33 includes a logical frequency mapping part 36 and a physical frequency mapping part 37.

The logical frequency mapping part 36 performs frequency allocation so that adjacent cell interference can be averaged as much as possible. Such optimal averaging of the adjacent cell interference means that interference of each channel included in the adjacent cell is minimally dispersed. Examples of the frequency allocation method for optimally averaging adjacent cell interference include the method based on the mutual orthogonal Latin square and the method based on "Frequency Hopping Method in OFDM Systems". The frequency allocation method of the logical frequency mapping part 36 is not limited to the above two methods, and any frequency allocation being capable of optimally averaging the adjacent cell interference can be used. Further, the logical frequency mapping can be performed using Equation 1 or 3.

The physical frequency mapping part 37 maps the symbol stream, which is mapped in the logical frequency mapping part 36, using a one-to-one mapping function. The one-to-one mapping function used in the physical frequency mapping part 37 can be a randomizing function or a function expressed using an Equation. The physical frequency mapping can be performed using Equation 2 or 4.

FIG. 7 illustrates another example of the frequency allocation and hopping part employed in FIG. 5.

Referring to FIG. 7, the frequency allocation and hopping part 33 includes a frequency mapping table device 38 and a frequency mapping part 39.

The frequency mapping table device 38 is for outputting a value from a table of all logical frequency mappings and physical frequency mappings. In other words, the frequency mapping table device 38 outputs a value from the table corresponding to a combination of frequency mapping and one-to-one frequency mapping capable of optimally averaging adjacent cell interference. The frequency mapping table device 38 can output the table value to perform the mapping based on Equations 1 and 2 or Equations 3 and 4.

The frequency mapping part 39 determines what frequencies are allocated to the symbol stream output from the symbol mapper depending on the table value output from the frequency mapping table device 38.

FIG. 8 illustrates a frequency hopping method of the transmitter according to an exemplary embodiment of the present invention.

Referring to FIG. 8, the inventive frequency hopping method includes the steps of determining a carrier to be allocated to a symbol in order to optimally average adjacent cell interference (Step 11), mapping the determined carrier using the one-to-one mapping function and finally determining the carrier to be allocated to the symbol (Step 12), and loading the symbol on the carrier determined in Step 12 (Step 13).

In the Step 11, for example, the carrier to be allocated to the symbol can be determined according to the method based on the mutual orthogonal Latin square or the method based on "Frequency Hopping Method in OFDM Systems". Alternatively, the carrier to be allocated to the symbol can be determined using Equation 1 or 3.

In the Step 12, for example, the carrier to be allocated to the symbol can be determined using Equation 2 or 4.

FIG. 9 illustrates a frequency hopping method of the transmitter according to another exemplary embodiment of the present invention.

Referring to FIG. 9, the inventive frequency hopping method includes the steps of determining a carrier to be allocated to a symbol so that both adjacent cell interference and adjacent carrier interference within the same cell can be optimally averaged (Step 21), and loading the symbol on the carrier determined in Step 21 (Step 22).

In the Step 21, for example, the carrier to be allocated to the symbol can be determined through combination of Equations 1 and 2 or through combination of Equations 3 and 4.

The invention claimed is:

1. A transmitter comprising:

a channel encoder configured to output a bit stream of encoded information data;

a symbol mapper configured to output a symbol stream obtained by constellating the bit stream;

a frequency allocation and hopping part configured to determine a frequency to be allocated to the symbol stream; and a multi-carrier modulator configured to load and output the symbol stream output from the frequency allocation and hopping part on a multi-carrier, wherein the frequency allocation and hopping part comprises a logical frequency mapping part configured to determine a frequency capable of optimally averaging adjacent cell interference, and a physical frequency mapping part configured to map the determined frequency from the a logical frequency mapping part one-to-one and determining a frequency, wherein the logical frequency mapping part performs mapping according to the following Equation: $L_{ij}^{k}=(k \times i+j)$ mod J, and the physical frequency mapping part performs mapping according to the following Equation:

$$f_{ij}^k = M^k(L_{ij}^k) = \begin{cases} (k+1) \times L_{ij}^k (\mathrm{mod}\, J) & \text{if } k < J-1 \\ r \times L_{ij}^k (\mathrm{mod}\, J) & \text{if } k = J-1, \end{cases} \text{ $r$ is predetermined natural number}$$

where, k: number of carrier groups existing during one frequency allocation period, J: number of carriers included in one carrier group, and $f_{ij}^k$: carrier allocated to a $j^{th}$ channel (user) in a $k^{th}$ carrier group of an $i^{th}$ cell.

2. A transmitter comprising:

a channel encoder configured to output a bit stream of encoded information data;

a symbol mapper configured to output a symbol stream obtained by constellating the bit stream, a frequency allocation and hopping part configured to determine a frequency to be allocated to the symbol stream; and a multi-carrier modulator configured to load and output the symbol stream output from the frequency allocation and hopping part on a multi-carrier, wherein the frequency allocation and hopping part comprises a logical frequency mapping part configured to determine a frequency capable of optimally averaging adjacent cell interference, and a physical frequency mapping part configured to map the determined frequency from the a logical frequency mapping part one-to-one and determining a frequency, wherein the logical frequency k mapping part performs mapping according to the following Equation: $L_{ij}^k = (k \times i + j) \bmod J$ and the physical frequency mapping part performs mapping according to the following Equation:

$$f_{ij}^k = M^k(L_{ij}^k) = \begin{cases} (k+1) \times L_{ij}^k (\mathrm{mod}\, J) & \text{if } k(\mathrm{mod}\, j) < J-1 \\ (r+1) \times L_{ij}^k (\mathrm{mod}\, J) & \text{if } k(\mathrm{mod}\, j) = J-1, r = k\, \%\, J \end{cases}$$

where, k % J is a quotient obtained by dividing k by J, k: number of carrier groups existing during one frequency allocation period, J: number of carriers included in one carrier group, and $f_{ij}^k$: carrier allocated to a $i^{th}$ channel (user) in a $k^{th}$ carrier group of an $i^{th}$ cell.

3. A transmitter comprising:

a channel encoder configured to output a bit stream of encoded information data;

a symbol mapper configured to output a symbol stream obtained by constellating the bit stream;

a frequency allocation and hopping part configured to determine a frequency to be allocated to the symbol stream; and a multi-carrier modulator configured to load and output the symbol stream output from the frequency allocation and hopping part on a multi-carrier, wherein the frequency allocation and hopping part comprises:

a frequency mapping table device configured to output a table value for optimally averaging both adjacent cell interference and adjacent carrier interference within the same cell simultaneously, and a frequency mapping part configured to determine a frequency to be allocated to the symbol stream output from the symbol mapper according to the table value output from the frequency mapping table device, wherein the frequency mapping table device outputs the table value based on a combination of two Equations: $L_{ij}^k = (k \times i + j) \bmod J$, and $$f_{ij}^k = M^k(L_{ij}^k) = \begin{cases} (k+1) \times L_{ij}^k (\mathrm{mod}\, J) & \text{if } k < J-1 \\ r \times L_{ij}^k (\mathrm{mod}\, J) & \text{if } k = J-1, \end{cases} \text{ $r$ is predetermined natural number}$$

where, k: number of carrier groups existing during one frequency allocation period, J: number of carriers included in one carrier group, and $f_{ij}^k$: carrier allocated to a $j^{th}$ channel (user) in a $k^{th}$ carrier group of an $i^{th}$ cell.

4. A transmitter comprising:

a channel encoder configured to output a bit stream of encoded information data;

a symbol mapper configured to output a symbol stream obtained by constellating the bit stream;

a frequency allocation and hopping part configured to determine a frequency to be allocated to the symbol stream; and a multi-carrier modulator configured to load and output the symbol stream output from the frequency allocation and hopping part on a multi-carrier, wherein the frequency allocation and hopping part comprises:

a frequency mapping table device configured to output a table value for optimally averaging both adjacent cell interference and adjacent carrier interference within the same cell simultaneously, and a frequency mapping part configured to determine a frequency to be allocated to the symbol stream output from the symbol mapper according to the table value output from the frequency mapping table device, wherein the frequency mapping table device outputs the table value based on a combination of two Equations: $L_{ij}^k = (k \times i + j) \bmod J$, and $$f_{ij}^k = M^k(L_{ij}^k) = \begin{cases} (k+1) \times L_{ij}^k (\mathrm{mod}\, J) & \text{if } k(\mathrm{mod}\, J) < J-1 \\ r \times L_{ij}^k (\mathrm{mod}\, J) & \text{if } k(\mathrm{mod}\, J) = J-1, r = k\, \%\, J \end{cases}$$

where, k % J is a quotient obtained by dividing k by J, k: number of carrier groups existing during one frequency allocation period, J: number of carriers included in one carrier group, and $f_{ij}^k$: carrier allocated to a $j^{th}$ channel (user) in a $k^{th}$ carrier group of an $i^{th}$ cell.

5. A frequency hopping method of a transmitter, the method comprising the steps of:

(a) determining a carrier to be allocated to a symbol such that adjacent cell interference is optimally averaged, (b) mapping the determined carrier using a one-to-one mapping function, and finally determining a carrier to be allocated to the symbol, and (c) loading the symbol on the carrier determined in step (b), wherein in step (a), the carrier to be allocated to the symbol is determined by the following Equation: $L_{ij}^k = (k \times i + j)$ mod J and in step (b), the carrier to be allocated to the symbol is determined by the following Equation:

$$f_{ij}^k = M^k(L_{ij}^k) = \begin{cases} (k+1) \times L_{ij}^k (\text{mod} J) & \text{if } k < J-1 \\ r \times L_{ij}^k (\text{mod} J) & \text{if } k = J-1, \end{cases} \quad r \text{ is predetermined natural number}$$

where, k: number of carrier groups existing during one frequency allocation period, J: number of carriers included in one carrier group, and $f_{ij}^k$: carrier allocated to a $j^{th}$ channel (user) in a $k^{th}$ carrier group of an cell.

6. A frequency hopping method of a transmitter, the method comprising the steps of:
   (a) determining a carrier to be allocated to a symbol such that adjacent cell interference is optimally averaged;
   (b) mapping the determined carrier using a one-to-one mapping function, and finally determining a carrier to be allocated to the symbol; and
   (c) loading the symbol on the carrier determined in step (b),
   wherein in step (a), the carrier to be allocated to the symbol is determined by the following Equation: $L_{ij}^k = (k \times i + j)$ mod J, and in step (b), the carrier to be allocated to the symbol is determined by the following Equation:

$$f_{ij}^k = M^k(L_{ij}^k) = \begin{cases} (k+1) \times L_{ij}^k (\text{mod} J) & \text{if } k(\text{mod} j) < J-1 \\ (r+1) \times L_{ij}^k (\text{mod} J) & \text{if } k(\text{mod} j) = J-1, r = k \% J \end{cases}$$

where, k % J is a quotient obtained by dividing k by J, k: number of carrier groups existing during one frequency allocation period, J: number of carriers included in one carrier group, and $f_{ij}^k$: carrier allocated to a $j^{th}$ channel (user) in a $k^{th}$ carrier group of an $i^{th}$ cell.

7. A frequency hopping method of a transmitter, the method comprising the steps of:
   (a) determining a carrier to be allocated to a symbol such that adjacent cell interference and adjacent carrier interference within the same cell are both optimally averaged, and
   (b) loading the symbol on the determined carrier,
   wherein in step (a), the carrier to be allocated to the symbol is determined by a combination of the following two Equations: $L_{ij}^k = (k \times i + j)$ mod J, and $$f_{ij}^k = M^k(L_{ij}^k) = \begin{cases} (k+1) \times L_{ij}^k (\text{mod} J) & \text{if } k < J-1 \\ r \times L_{ij}^k (\text{mod} J) & \text{if } k = J-1, \end{cases} \quad r \text{ is predetermined natural number}$$

where, k: number of carrier groups existing during one frequency allocation period, J: number of carriers included in one carrier group, and $f_{ij}^k$: carrier allocated to a $i^{th}$ channel (user) in a $k^{th}$ carrier group of an $i^{th}$ cell.

8. A frequency hopping method of a transmitter, the method comprising the steps of:
   (a) determining a carrier to be allocated to a symbol such that adjacent cell interference and adjacent carrier interference within the same cell are both optimally averaged; and
   (b) loading the symbol on the determined carrier,
   wherein in step (a), the carrier to k be allocated to the symbol is determined by the following two Equations: $L_{ij}^k = (k \times i + j)$ mod J, and $$f_{ij}^k = M^k(L_{ij}^k) = \begin{cases} (k+1) \times L_{ij}^k (\text{mod} J) & \text{if } k(\text{mod} j) < J-1 \\ (r+1) \times L_{ij}^k (\text{mod} J) & \text{if } k(\text{mod} j) = J-1, r = k \% J \end{cases}$$

where, k % J: is a quotient obtained by dividing k by J, k: number of carrier groups existing during one frequency allocation period, J: number of carriers included in one carrier group, and $f_{ij}^k$: carrier allocated to a $j^{th}$ channel (user) in a $k^{th}$ carrier group of an $i^{th}$ cell.

* * * * *